(12) United States Patent
Chen et al.

(10) Patent No.: US 12,130,524 B2
(45) Date of Patent: Oct. 29, 2024

(54) DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Xiaoming Chen, Shenzhen (CN); Peng Wan, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 414 days.

(21) Appl. No.: 17/598,294

(22) PCT Filed: Aug. 10, 2021

(86) PCT No.: PCT/CN2021/111711
§ 371 (c)(1),
(2) Date: Sep. 26, 2021

(87) PCT Pub. No.: WO2023/279468
PCT Pub. Date: Jan. 12, 2023

(65) Prior Publication Data
US 2023/0244112 A1  Aug. 3, 2023

(30) Foreign Application Priority Data
Jul. 6, 2021  (CN) .......... 202110763151.2

(51) Int. Cl.
*G02F 1/1362* (2006.01)
*G02F 1/1345* (2006.01)
*G09G 3/00* (2006.01)

(52) U.S. Cl.
CPC ...... *G02F 1/136254* (2021.01); *G02F 1/1345* (2013.01); *G02F 1/136286* (2013.01); *G09G 3/006* (2013.01)

(58) Field of Classification Search
CPC ............. G02F 1/1345; G02F 1/1362; G02F 1/136254; G02F 1/136286; G09G 3/00;
(Continued)

(56) References Cited

U.S. PATENT DOCUMENTS

| 2007/0046316 A1 | 3/2007 | Uei et al. | |
|---|---|---|---|
| 2010/0140615 A1* | 6/2010 | Li ..................... | G09G 3/006 257/E23.002 |

(Continued)

FOREIGN PATENT DOCUMENTS

| CN | 105676495 A | 6/2016 |
|---|---|---|
| CN | 108231798 A | 6/2018 |

(Continued)

OTHER PUBLICATIONS

Chinese Office Action issued in corresponding Chinese Patent Application No. 202110763151.2 dated Apr. 22, 2023, bages 1-7, 18pp.

(Continued)

*Primary Examiner* — Eman A Alkafawi
*Assistant Examiner* — Courtney G McDonnough
(74) *Attorney, Agent, or Firm* — The Roy Gross Law Firm, LLC; Roy Gross (57) ABSTRACT

The present disclosure discloses a display panel. The display panel includes a lighting test unit. The lighting test unit includes: signal input terminal sets, each including signal input terminals; shorting bar sets, each including shorting bars; and data signal line sets, each including data signal lines, where the signal input terminals are electrically connected to the shorting bars, the data signal lines are electri- (Continued)

cally connected to the shorting bars, and each shorting bar is connected end to end.

20 Claims, 5 Drawing Sheets

(58) Field of Classification Search
CPC ... G09G 3/006; G09G 3/36; G09G 2300/0426
USPC .................................................. 324/760.01
See application file for complete search history.

(56) References Cited

U.S. PATENT DOCUMENTS

| | | | |
|---|---|---|---|
| 2018/0203303 A1* | 7/2018 | Liu | G02F 1/1362 |
| 2022/0309969 A1* | 9/2022 | Li | G09G 3/006 |

FOREIGN PATENT DOCUMENTS

| | | |
|---|---|---|
| CN | 108490654 A | 9/2018 |
| CN | 108803177 A | 11/2018 |
| CN | 110767131 A | 2/2020 |
| CN | 111583842 A | 8/2020 |
| CN | 112068365 A | 12/2020 |
| CN | 112435620 A | 3/2021 |

OTHER PUBLICATIONS

PCT International Search Report for International Application No. PCT/CN2021/111711, mailed on Feb. 28, 2022, 8pp.
PCT Written Opinion of the International Searching Authority for International Application No. PCT/CN2021/111711, mailed on Feb. 28, 2022, 8pp.

* cited by examiner

DISPLAY PANEL

CROSS REFERENCE TO RELATED APPLICATIONS

This application is a National Phase of PCT Patent Application No. PCT/CN2021/111711 having International filing date of Aug. 10, 2021, which claims the benefit of priority of Chinese Application No. 202110763151.2 filed on Jul. 6, 2021. The contents of the above applications are all incorporated by reference as if fully set forth herein in their entirety.

FIELD OF INVENTION

The present disclosure relates to the field of display technologies, and in particular, to a display panel.

BACKGROUND OF INVENTION

Generally, a lighting test is required for an independent liquid crystal display panel cut from a display screen, to determine whether a screen is abnormal. During conventional bonding lead designing, all data signal lines are respectively connected to three independent shorting bars. Such a design method can form lots of intersection areas among the three shorting bars (RGB), generating large stray capacitances. The stray capacitances in the areas are equivalent to a total capacitance of data signal lines in a display area. Therefore, obvious capacitive coupling exists among the shorting bars, causing color mixture in a pure-color screen. In the prior art, a data voltage is usually reduced to avoid the color mixture. However, after the data voltage is reduced, a charging rate of a display panel can be excessively low, resulting in screen splitting or larger display nonuniformity.

SUMMARY OF INVENTION

Technical Problem

Thus, a technical problem to be resolved in the present disclosure is to alleviate the color mixture and alleviate the screen splitting or the larger display nonuniformity caused by the reduction of the data voltage.

Technical Solution

To solve the foregoing problems, the technical solutions provided in the present disclosure are as follows:

The present disclosure provides a display panel. The display panel includes a display area and a non-display area disposed at a periphery of the display area. The display panel further includes at least one lighting test unit. Each lighting test unit includes:

at least one signal input terminal set, each including at least three signal input terminals;

at least one shorting bar set, each including at least three shorting bars; and at least one data signal line set, each including at least three data signal lines.

The at least three signal input terminals are electrically connected to the at least three shorting bars in a one-to-one manner. The at least three data signal lines are electrically connected to the at least three shorting bars in a one-to-one manner. Each shorting bar is connected end to end.

In an optional embodiment of the present disclosure, the each shorting bar set includes a first shorting bar, a second shorting bar, and a third shorting bar. Any of the first shorting bar, the second shorting bar, and the third shorting bar is connected end to end. The second shorting bar surrounds the third shorting bar, and the first shorting bar surrounds the second shorting bar.

In an optional embodiment of the present disclosure, the each signal input terminal and the each data signal line are electrically connected to the each shorting bar using at least one connection hole structure.

In an optional embodiment of the present disclosure, each connection hole structure includes at least one first connection hole and at least one second connection hole. The lighting test unit at the each connection hole structure includes:

a first conductive line layer;

a second conductive line layer, located above the first conductive line layer; and a third conductive line layer, located above the second conductive line layer and on inner walls of the first connection hole and the second connection hole.

The third conductive line layer is electrically connected to the first conductive line layer through the first connection hole, and is electrically connected to the second conductive line layer through the second connection hole.

In an optional embodiment of the present disclosure, the signal input terminal, the data signal line, and the second conductive line layer are disposed in a same layer.

In an optional embodiment of the present disclosure, the shorting bar and the first conductive line layer are disposed in a same layer.

In an optional embodiment of the present disclosure, a plurality of connection hole structures spaced apart from each other are formed on the each shorting bar.

In an optional embodiment of the present disclosure, the lighting test unit at the each connection hole structure further includes at least one fourth conductive line layer, the fourth conductive line layer is formed on the third conductive line layer, and a material of the fourth conductive line layer is same as a material of the third conductive line layer.

In an optional embodiment of the present disclosure, the fourth conductive line layer further covers at least part of the shorting bar outside the connection hole structure.

In an optional embodiment of the present disclosure, the each shorting bar is in an annular shape.

In an optional embodiment of the present disclosure, each lighting test unit includes one shorting bar set, two signal input terminal sets, and two data signal line sets.

In an optional embodiment of the present disclosure, the first shorting bar, the second shorting bar, and the third shorting bar are respectively selected from at least one of an R shorting bar, a G shorting bar, a B shorting bar, and a W shorting bar.

In an optional embodiment of the present disclosure, the each signal input terminal set includes a first signal terminal, a second signal terminal, and a third signal terminal, the first signal terminal is electrically connected to the first shorting bar, the second signal terminal is electrically connected to the second shorting bar, and the third signal terminal is electrically connected to the third shorting bar.

In an optional embodiment of the present disclosure, the each data signal line set includes two first data signal lines, two second data signal lines, and two third data signal lines, one ends of the first data signal lines are electrically connected to the first shorting bar, one ends of the second data signal lines are electrically connected to the second shorting bar, and one ends of the third data signal lines are electrically connected to the third shorting bar.

Beneficial Effects

According to the display panel provided in the present disclosure, each shorting bar of the lighting test unit is connected end to end, so that the resistance of the shorting bar can be reduced. In this way, a data voltage can rapidly return to an original voltage after the coupling, thereby alleviating or even eliminating the above color mixture.

In addition, the fourth conductive line layer having a same material as the third conductive line layer is added to part of the shorting bar, that is to say, a plurality of traces are used, so as to increase a cross-sectional area of the shorting bar (that is, the third conductive line layer and the fourth conductive line layer are both regarded as part of the shorting bar). Therefore, the resistance of the shorting bar can be reduced, thereby further alleviating or even eliminating the color mixture and further alleviating the screen splitting or the larger display nonuniformity.

BRIEF DESCRIPTION OF DRAWINGS

To describe the technical solutions in the embodiments of the present disclosure more clearly, the following briefly describes accompanying drawings required for describing the embodiments. Apparently, the accompanying drawings in the following descriptions show merely some embodiments of the present disclosure, and a person skilled in the art can still derive other accompanying drawings according to these accompanying drawings without creative efforts.

DETAILED DESCRIPTION OF PREFERRED EMBODIMENTS

The following clearly and completely describes the technical solutions in the embodiments of the present disclosure with reference to the accompanying drawings in the embodiments of the present disclosure. Apparently, the described embodiments are merely some embodiments rather than all the embodiments of the present disclosure. All other embodiments obtained by a person skilled in the art based on the embodiments of the present disclosure without creative efforts shall fall within the protection scope of the present disclosure.

In the description of the present disclosure, it should be understood that orientation or position relationships indicated by the terms such as "above", and "below" are based on orientation or position relationships shown in the accompanying drawings, and are used only for ease and brevity of illustration and description, rather than indicating or implying that the mentioned apparatus or element needs to have a particular orientation or needs to be constructed and operated in a particular orientation. Therefore, such terms are not to be construed as a limitation to the present disclosure. In addition, the terms "first" and "second" are merely used for descriptive purposes only, and are not to be construed as indicating or implying relative importance or implicitly indicating the number of indicated technical features. Thus, features defined by "first" and "second" can explicitly or implicitly include one or more of the features. In the descriptions of the present disclosure, "a plurality of" means two or more, unless otherwise definitely and specifically limited.

In the present disclosure, reference numbers and/or reference letters may be repeated in different embodiments. Such repetition is intended to simplify and clarify the present disclosure, and does not indicate a relationship between various implementations and/or settings that are discussed.

In a conventional display panel, obvious capacitance coupling occurs between shorting bars of a lighting test unit, resulting in color mixture in a pure color screen. In view of the technical problem, in the present disclosure, each shorting bar of the lighting test unit is connected end to end, so that the resistance of the shorting bar can be reduced. In this way, a data voltage can rapidly return to an original voltage after the coupling, thereby alleviating or even eliminating the color mixture.

The display panel in the present disclosure is described in detail below with reference to specific embodiments.

Figure 1:
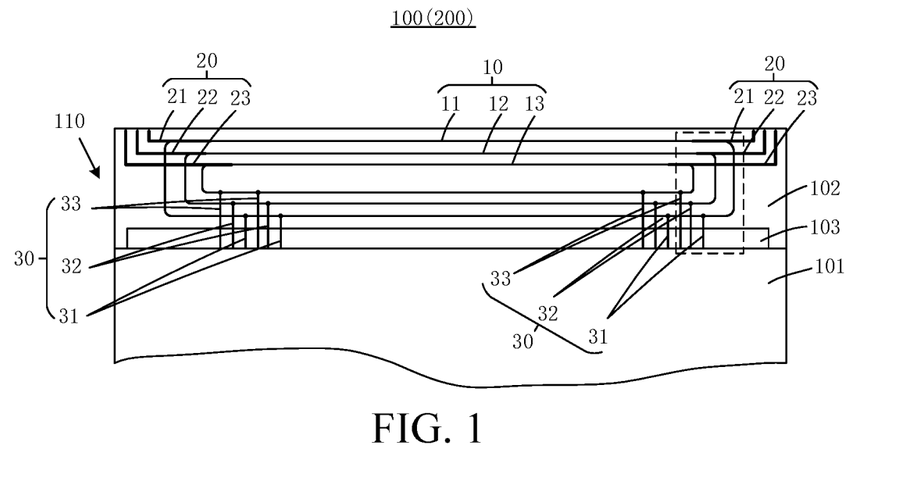
FIG. 1 is a schematic diagram of a display panel according to an embodiment of the present disclosure.
Figure 2:
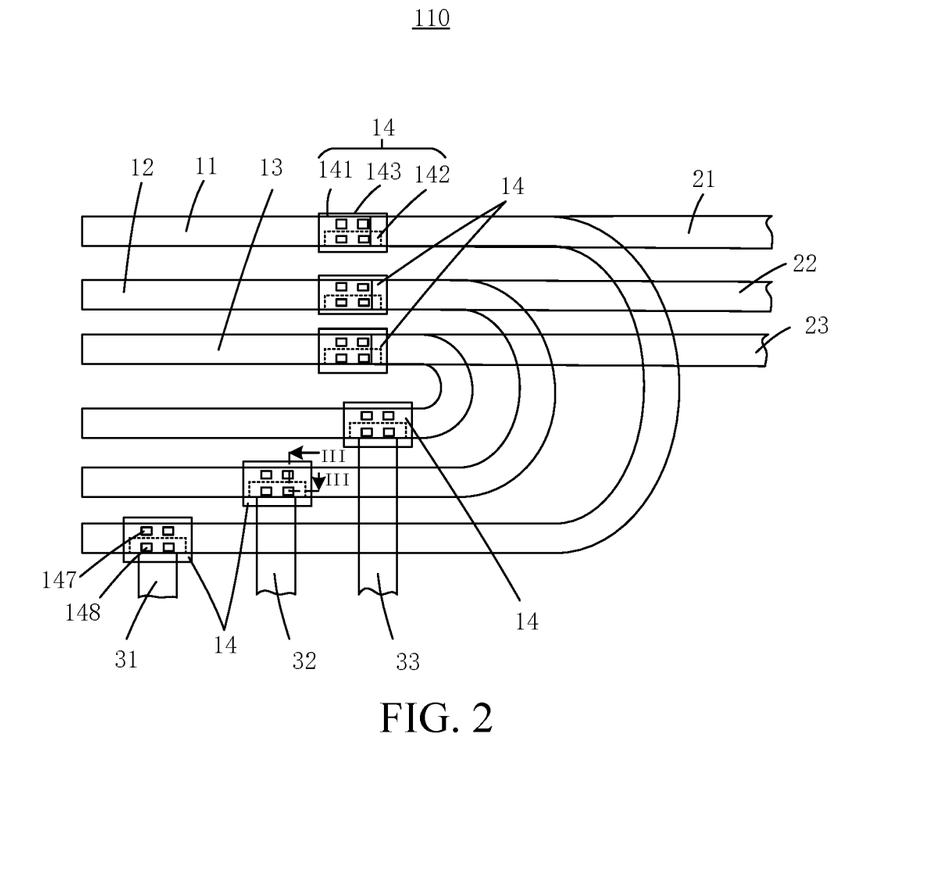
FIG. 2 is an enlarged view of the display panel (a first embodiment) in a dashed-line box of FIG. 1.
Figure 3:
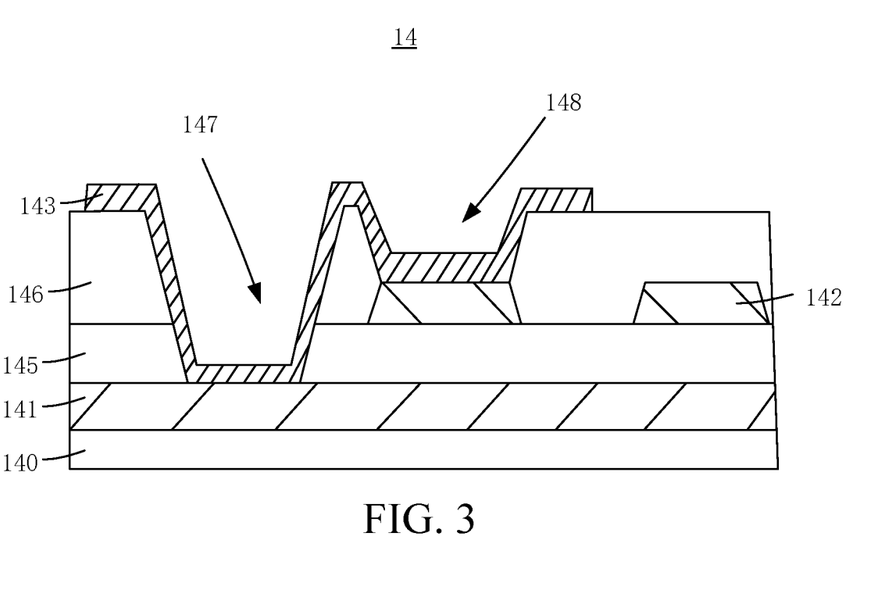
FIG. 3 is a schematic diagram of a connection hole structure of the display panel shown in FIG. 2 along III-III.

Referring to FIGS. 1 to 3, a first embodiment of the present disclosure provides a display panel 100. The display panel 100 includes a display area 101 and a non-display area 102 disposed at a periphery of the display area 101. The display panel 100 further includes a packaging area 103. The packaging area 103 is located in the non-display area 102 and adjacent to the display area 101.

Referring to FIG. 1, the display panel 100 further includes at least one lighting test unit 110. Each lighting test unit 110 includes at least one shorting bar set 10, at least one signal input terminal set 20, and at least one data signal line set 30. Each signal input terminal set 20 includes at least three signal input terminals. Each shorting bar set 10 includes at least three shorting bars. Each data signal line set 30 includes at least three data signal lines. The at least three signal input terminals are electrically connected to the at least three shorting bars in a one-to-one manner. The at least three data signal lines are electrically connected to the at least three shorting bars in a one-to-one manner. Each shorting bar is connected end to end.

The shorting test bar is configured to deliver a lighting test signal to the data signal line. The signal input terminal is configured to input the lighting test signal. The data signal line is configured to deliver the lighting test signal to a pixel driving circuit (not shown in the figure) in the display area 101, so as to drive pixels to emit light.

In the present embodiment, each lighting test unit 110 includes one shorting bar set 10, two signal input terminal sets 20, and two data signal line sets 30. By disposing the two signal input terminal sets 20 and the two data signal line sets 30, the uniformity of a displayed screen can be improved.

In detail, in the present embodiment, the each shorting bar set 10 includes a first shorting bar 11, a second shorting bar 12, and a third shorting bar 13. Any of the first shorting bar, 11 the second shorting bar 12, and the third shorting bar 13 is connected end to end. The second shorting bar 12 surrounds the third shorting bar 13, and the first shorting bar 11 surrounds the second shorting bar 12.

In the present embodiment, the first shorting bar 11, the second shorting bar 12, and the third shorting bar 13 can be respectively selected from at least one of an R shorting bar, a G shorting bar, and a B shorting bar. Preferably, the first shorting bar 11 is an R shorting bar, the second shorting bar 12 is a G shorting bar, and the third shorting bar 13 is a B shorting bar.

Certainly, in other embodiments, a quantity of the shorting bars can be determined according to types and a quantity of corresponding pixels. For example, the shorting bars can also be W shorting bars or include more than one R shorting bar.

In detail, in the present embodiment, the each signal input terminal set 20 includes a first signal terminal 21, a second first signal terminal 22, and a third first signal terminal 23. The first signal terminal 21 is electrically connected to the first shorting bar 11, the second signal terminal 22 is electrically connected to the second shorting bar 12, and the third signal terminal 23 is electrically connected to the third shorting bar 13.

In detail, in the present embodiment, the each data signal line set 30 includes a first data signal line 31, a second data signal line 32, and a third data signal line 33. Preferably, the each data signal line set 30 includes two first data signal lines 31, two second data signal lines 32, and two third data signal lines 33. One ends of the first data signal lines 31 are electrically connected to the first shorting bar 11, one ends of the second data signal lines 32 are electrically connected to the second shorting bar 12, and one ends of the third data signal lines 33 are electrically connected to the third shorting bar 13.

Referring to FIGS. 2 to 3, the each signal input terminal and the each data signal line are electrically connected to the each shorting bar using at least one connection hole structure 14.

In detail, each connection hole structure 14 includes at least one first connection hole 147 and at least one second connection hole 148. In the present embodiment, the at least one first connection hole 147 is arranged in a row along an extending direction of each shorting bar, the at least one second connection hole 148 is arranged in a row along the extending direction of each shorting bar, and one first connection hole 147 and one second connection hole 148 are arranged in a column.

In detail, referring to FIGS. 2 to 3, the lighting test unit 110 at the each connection hole structure 14 includes a first conductive line layer 141, a second conductive line layer 142, and a third conductive line layer 143. The second conductive line layer 142 is located above the first conductive line layer 141. The third conductive line layer 143 is located above the second conductive line layer 142 and on inner walls of the first connection hole 147 and the second connection hole 148. The third conductive line layer 143 is electrically connected to the first conductive line layer 141 through the first connection hole 147, and is electrically connected to the second conductive line layer 142 through the second connection hole 148.

The lighting test unit 110 at the each connection hole structure 14 further includes an insulating base material 140, a first insulating layer 145, and a second insulating layer 146. The first conductive line layer 141 is formed on the insulating base material 140. The first insulating layer 145 is formed on the first conductive line layer 141. The second conductive line layer 142 is formed on the first insulating layer 145. The second insulating layer 146 is formed on the second conductive line layer 142 and covers the first insulating layer 145. The third conductive line layer 143 is formed on the second insulating layer 146.

The signal input terminal, the data signal line, and the second conductive line layer are disposed in a same layer 142. That is, the second conductive line layer 142 can also be regarded as part of the data signal line.

The shorting bar and the first conductive line layer 141 are disposed in a same layer. That is to say, the first conductive line layer 141 can also be regarded as part of the shorting bar.

A plurality of connection hole structures 14 spaced apart from each other are formed on the each shorting bar.

According to the display panel 100 provided in the present disclosure, each shorting bar of the lighting test unit 110 is connected end to end, so that the resistance of the shorting bar can be reduced. In this way, a data voltage can rapidly return to an original voltage after the coupling, thereby alleviating or even eliminating the color mixture.

Figure 4:
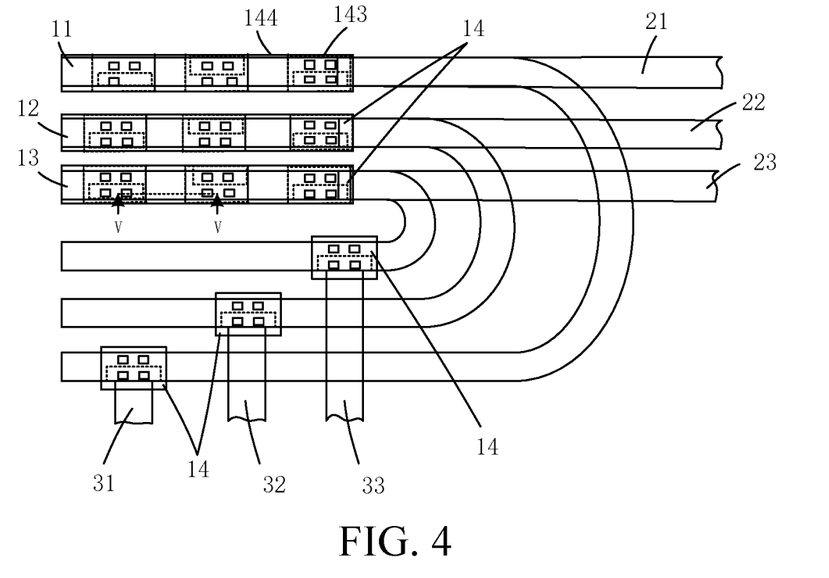
FIG. 4 is an enlarged view of the display panel (a second embodiment) in the dashed-line box of FIG. 1.
Figure 5:
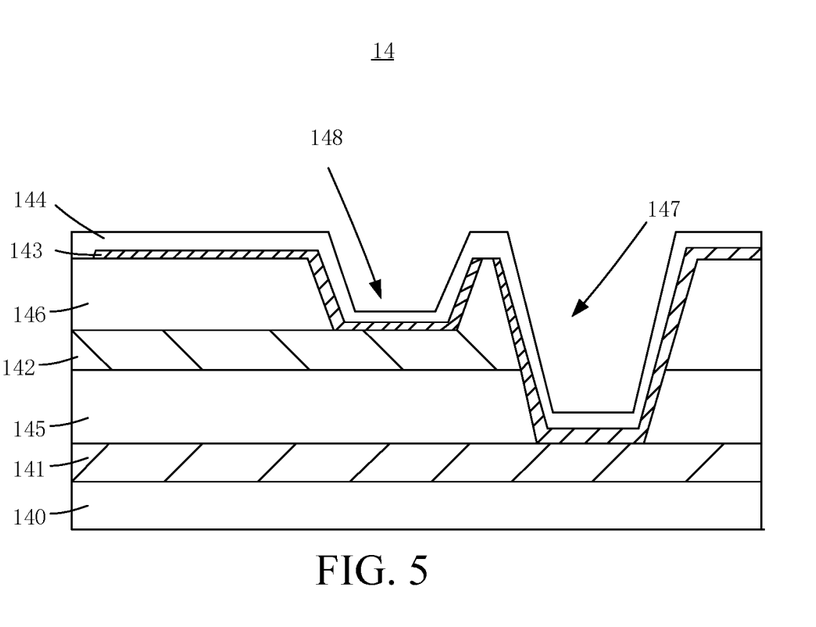
FIG. 5 is a schematic diagram of a connection hole structure of the display panel shown in FIG. 4 along V-V.

Referring to FIGS. 4 to 5, a second embodiment of the present disclosure provides a display panel 200. A structure of the display panel 200 is similar to the structure of the display panel 100, except that the lighting test unit 110 at the each connection hole structure 14 further includes at least one fourth conductive line layer 144. The fourth conductive line layer 144 is formed on the third conductive line layer 143, and a material of the fourth conductive line layer 144 is same as a material of the third conductive line layer 143.

In another optional embodiment of the present disclosure, in addition to the third conductive line layer 143, the fourth conductive line layer 144 further covers at least part of the shorting bar outside the connection hole structure 14.

According to the display panel 200 provided in the present disclosure, the fourth conductive line layer having a same material as the third conductive line layer is added to part of the shorting bar, that is to say, a plurality of traces are used, so as to increase a cross-sectional area of the shorting bar (that is, the third conductive line layer and the fourth conductive line layer are both regarded as part of the shorting bar). Therefore, the resistance of the shorting bar can be reduced, thereby further alleviating or even eliminating the color mixture and further alleviating the screen splitting or the larger display nonuniformity.

In the foregoing embodiments, the description of each embodiment focuses on a different part, and for parts that are not described in detail in one embodiment, reference can be made to the related description of other embodiments.

A display panel provided in the embodiments of the present disclosure is described in detail above. Although the principles and implementations of the present disclosure are described by using specific examples in this specification, the descriptions of the foregoing embodiments are merely intended to help understand the technical solution and core idea of the present disclosure. A person of ordinary skill in the art should understand that modifications can be still made to the technical solutions described in the foregoing embodiments or equivalent replacements can be made to some technical features thereof, as long as such modifications or replacements do not make the essence of corresponding technical solutions depart from the scope of the technical solutions of the embodiments of the present disclosure.

What is claimed is:

1. A display panel, having a display area and a non-display area surrounding the display area, the display panel comprising at least one lighting test unit each comprising:

one or more signal input terminal sets each comprising at least three signal input terminals;

at least one shorting bar set, each comprising at least three shorting bars; and one or more data signal line sets each comprising at least three data signal lines, wherein the one or more signal input terminal sets comprise a first signal input terminal set and a second signal input terminal set, each of the at least three shorting bars comprise a first bar branch and a second bar branch, both ends of each of the first bar branch and the second bar branch are connected to one of the at least three signal input terminals of the first signal input terminal set and one of the at least three signal input terminals of the second signal input terminal set, respectively, each of the at least three data signal lines is connected to the second bar branch of one of the at least three shorting bars, so that the at least three data signal lines are connected to the at least three shorting bars, respectively.

2. The display panel as claimed in claim 1, wherein the at least three shorting bars comprise a first shorting bar, a second shorting bar, and a third shorting bar, the second shorting bar surrounds the third shorting bar, and the first shorting bar surrounds the second shorting bar.

3. The display panel as claimed in claim 1, wherein each of the at least three signal input terminals and the each of the at least three data signal lines are electrically connected to each of the at least three shorting bars through one or more connection hole structures.

4. The display panel as claimed in claim 3, wherein each of the one or more connection hole structures comprises at least one first connection hole and at least one second connection hole, and at the each of the one or more connection hole structures each of the lighting test unit comprises:
 a first conductive line layer;
 a second conductive line layer, located above the first conductive line layer; and
 a third conductive line layer, located above the second conductive line layer and on inner walls of the first connection hole and the second connection hole, wherein
 the third conductive line layer is electrically connected to the first conductive line layer through the first connection hole, and is electrically connected to the second conductive line layer through the second connection hole.

5. The display panel as claimed in claim 4, wherein the at least three signal input terminals, the at least three data signal lines, and the second conductive line layer are disposed in a same layer.

6. The display panel as claimed in claim 4, wherein the at least three shorting bars and the first conductive line layer are disposed in a same layer.

7. The display panel as claimed in claim 4, wherein the one or more connection hole structures comprise a plurality of connection hole structures arranged at intervals on the each of the at least three shorting bars.

8. The display panel as claimed in claim 4, wherein at the each of the one or more connection hole structures each of the lighting test unit further comprises a fourth conductive line layer provided on the third conductive line layer, and the fourth conductive line layer comprises a material same as the third conductive line layer.

9. The display panel as claimed in claim 5, wherein at the each of the one or more connection hole structures each of the lighting test unit further comprises a fourth conductive line layer provided on the third conductive line layer, and the fourth conductive line layer comprises a material same as the third conductive line layer.

10. The display panel as claimed in claim 6, wherein at the each of the one or more connection hole structures each of the lighting test unit further comprises a fourth conductive line layer provided on the third conductive line layer, and the fourth conductive line layer comprises a material same as the third conductive line layer.

11. The display panel as claimed in claim 7, wherein at the each of the one or more connection hole structures each of the lighting test unit further comprises a fourth conductive line layer provided on the third conductive line layer, and the fourth conductive line layer comprises a material same as the third conductive line layer.

12. The display panel as claimed in claim 8, wherein the fourth conductive line layer further covers at least part of the each of the at least three shorting bars outside the each of the connection hole structures.

13. The display panel as claimed in claim 9, wherein the fourth conductive line layer further covers at least part of the each of the at least three shorting bars outside the each of the connection hole structures.

14. The display panel as claimed in claim 10, wherein the fourth conductive line layer further covers at least part of the each of the at least three shorting bars outside the each of the connection hole structures.

15. The display panel as claimed in claim 11, wherein the fourth conductive line layer further covers at least part of the each of the at least three shorting bars outside the each of the connection hole structures.

16. The display panel as claimed in claim 1, wherein the each of the at least three shorting bars forms a loop.

17. The display panel as claimed in claim 1, wherein each of the lighting test unit comprises one shorting bar set, and two data signal line sets.

18. The display panel as claimed in claim 2, wherein the first shorting bar, the second shorting bar, and the third shorting bar are respectively selected from at least one of an R shorting bar, a G shorting bar, a B shorting bar, or a W shorting bar.

19. The display panel as claimed in claim 2, wherein each of the one or more signal input terminal sets comprise a first signal terminal, a second signal terminal, and a third signal terminal, the first signal terminal is electrically connected to the first shorting bar, the second signal terminal is electrically connected to the second shorting bar, and the third signal terminal is electrically connected to the third shorting bar.

20. The display panel as claimed in claim 2, wherein each of the one or more data signal line sets comprise two first data signal lines, two second data signal lines, and two third data signal lines, an end of each of the first data signal lines is electrically connected to the first shorting bar, an end of each of the second data signal lines is electrically connected to the second shorting bar, and an end of each of the third data signal lines is electrically connected to the third shorting bar.

* * * * *